US011671451B1

(12) United States Patent
Gupta et al.

(10) Patent No.: US 11,671,451 B1
(45) Date of Patent: Jun. 6, 2023

(54) SERVER/CLIENT RESOLUTION FOR LINK LEVEL SECURITY PROTOCOL

(71) Applicant: Amazon Technologies, Inc., Seattle, WA (US)

(72) Inventors: Sanjeev Gupta, Fremont, CA (US); Frederick David Sinn, Seattle, WA (US); Venkata Satish Kumar Vangala, San Jose, CA (US); John Mark Glotzer, North Bend, WA (US)

(73) Assignee: Amazon Technologies, Inc., Seattle, WA (US)

( * ) Notice: Subject to any disclaimer, the term of this patent is extended or adjusted under 35 U.S.C. 154(b) by 735 days.

(21) Appl. No.: 16/532,297

(22) Filed: Aug. 5, 2019

(51) Int. Cl.
*H04L 9/40* (2022.01)

(52) U.S. Cl.
CPC .......... *H04L 63/162* (2013.01); *H04L 63/061* (2013.01); *H04L 63/0869* (2013.01); *H04L 63/0876* (2013.01)

(58) Field of Classification Search
CPC . H04L 63/162; H04L 63/061; H04L 63/0869; H04L 63/0876
See application file for complete search history.

(56) References Cited

U.S. PATENT DOCUMENTS

| 7,657,744 | B2* | 2/2010 | Kok | H04W 12/06 |
| | | | | 713/168 |
| 8,312,129 | B1* | 11/2012 | Miller | H04L 9/40 |
| | | | | 709/227 |
| 9,306,949 | B1* | 4/2016 | Richard | H04L 12/2859 |
| 2004/0208122 | A1* | 10/2004 | McDysan | H04L 67/306 |
| | | | | 370/468 |
| 2004/0223456 | A1* | 11/2004 | Mansharamani | H04L 49/10 |
| | | | | 370/229 |

(Continued)

FOREIGN PATENT DOCUMENTS

| KR | 20170076392 A | * | 7/2017 | ......... H04L 63/0876 |
| WO | WO-2006020329 A2 | * | 2/2006 | ............. H04L 63/08 |

OTHER PUBLICATIONS

Foreign Reference Translation attached (Year: 2017).*

(Continued)

*Primary Examiner* — Syed A Zaidi
(74) *Attorney, Agent, or Firm* — Klarquist Sparkman, LLP

(57) ABSTRACT

A secure communication channel is established between network devices separated by an unsecured physical space by dynamically performing server/client resolution based on comparison of unique identifiers of the devices. After a link between a first network device and a second network device is established, the devices exchange start frames in accordance with a network security protocol such as the Media Access Control Security (MACsec) protocol. Comparison logic at the first network device compares a value of a unique identifier of the first network device to a value of a unique identifier of the second network device obtained from the start frame transmitted by the second network device, and vice versa. Based on the comparison, one of the devices assumes a server/authenticator role, and the other device assumes a client/supplicant role. The devices operate in their determined roles to perform an authentication process and thereby establish a secure communication channel.

18 Claims, 8 Drawing Sheets

(56) References Cited

U.S. PATENT DOCUMENTS

2014/0123270 A1* 5/2014 Liu .................... H04L 63/0272
                                                            726/15
2015/0138963 A1* 5/2015 Lee ...................... H04W 48/04
                                                            370/230
2016/0373481 A1* 12/2016 Sultan ................ H04L 63/1433

OTHER PUBLICATIONS

Foreign Reference WO-2006020329 attached (Year: 2006).*
Google Scholar Search included (Year: 2022).*
NPL Search Terms (Year: 2023).*

* cited by examiner

_US 11,671,451 B1_

SERVER/CLIENT RESOLUTION FOR LINK LEVEL SECURITY PROTOCOL

BACKGROUND

An entity such as a web services provider may employ various measures to ensure the security of information transferred between computing devices, such as server computers and network devices. When information is transferred between computing devices within the same physically-secured facility, such as a building of a data center, security measures such as adoption of a network security protocol may not be needed. In contrast, when information is transferred over an unsecured physical span (e.g., between buildings or data centers), the information may be more vulnerable to observation or tampering by unauthorized parties. Accordingly, in this scenario, it may be appropriate to implement additional security measures, such as securing communications using a network security protocol.

A network security protocol can be used to establish a secure communication channel between two computing devices. Depending on the network security protocol, it may be necessary for one of the devices to assume a client (supplicant) role while the other device assumes a server (authenticator) role. The device assuming the server role may be responsible for authenticating the device in the client role, in order to establish a secure communication channel between the devices. This can include, for example, the device in the server role generating encryption keys and sending the keys to the device in the client role. Typically, the role to be assumed by a given device during implementation of a network security protocol is predefined during initial configuration of the device, such that the device's role is already established when it comes online. For example, the server computers of a given network may be configured to assume the client role, whereas the routers and switches of the network may be configured to assume the server role. Accordingly, when a link between a server computer and a switch is established in the network, the server computer assumes its predefined client role, whereas the switch assumes its predefined server role and proceeds to authenticate the server computer.

However, when attempting to establish a secure communication between network devices communicating across an unsecured physical span, such as edge routers located in separate buildings, it is less clear which device should assume the server role. This is especially true for connections between "peer" network devices (e.g., connections between routers and switches, as opposed to connections between routers/switches and server computers). For example, attempting to hard-code the role a given network device should assume for all possible connections with other network devices would be prohibitively complex. Thus, there exists a need for a mechanism to resolve which network device should assume the server role and which should assume the client role when two network devices come online and attempt to establish a secure communication channel.

DETAILED DESCRIPTION

Figure 1:
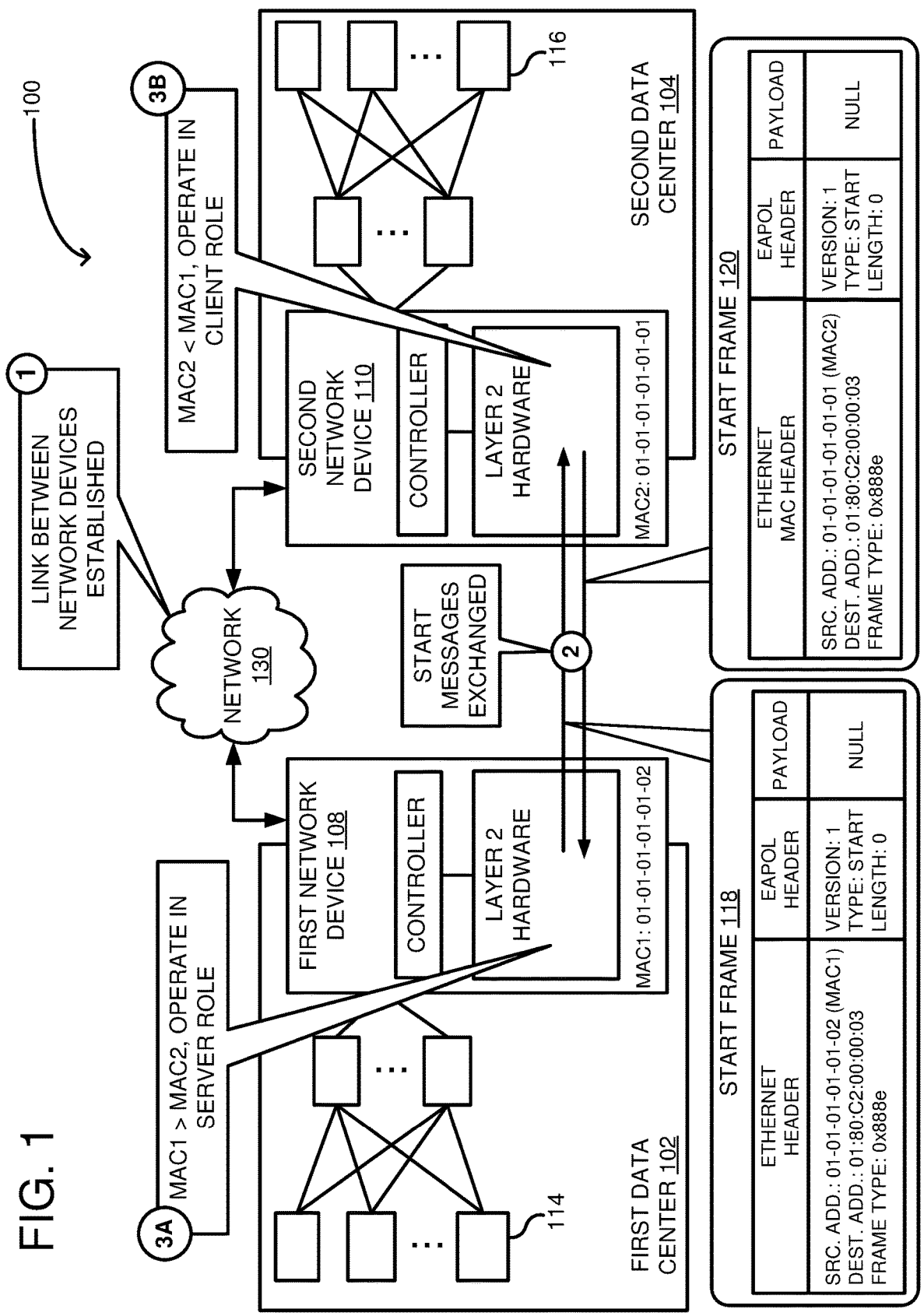
FIG. 1 is a diagram of two data centers, wherein network devices of the data centers perform sever/client resolution based on comparison of their network addresses, in accordance with one embodiment.

In one embodiment, a secure communication channel is established between network devices separated by an unsecured physical space by dynamically performing server/client resolution based on comparison of values of unique identifiers of the network devices. For example, after booting up, a first network device and a second network device can each transmit start frames in accordance with a network security protocol. The first and second network devices can be edge routers located in different buildings/data centers/network zones, for example. The start frames can include respective unique identifiers of the first and second network devices. At the first network device, comparison logic can compare the unique identifier of the first network to the unique identifier of the second network device obtained from the start frame transmitted by the second network device. Similarly, at the second network device, comparison logic can compare the unique identifier of the second network device to the unique identifier of the first network device obtained from the start frame transmitted by the first network device. Based on the comparison (e.g., based on the relationship between the values of the unique identifiers), one of the first and second network devices assumes the server/authenticator role, and the other of the first and second network devices assumes the client role. The first and second network devices can then operate in the determined roles to establish a secure communication channel. This can include the network device in the server role initiating an authentication process, and then both network devices performing mutual authentication of one another in accordance with the network security protocol. In some examples, the network devices have no established role prior to booting up. Alternatively, both network devices can be configured to boot up in the client role.

The network security protocol employed by the network devices to secure their communications can be a link level (Layer 2) security protocol. After the network devices successfully complete an authentication process to "secure" the link in accordance with the link level security protocol, cryptographic techniques can be used in accordance with the link level security protocol to encrypt the information stored within network packets exchanged by the network devices (alternatively referred to herein as encrypting the link between the network devices). Encrypted information is encoded such that the information generally cannot be understood unless the encrypted information is first decrypted with a decryption key. As a specific example, packets can be transferred over Ethernet links using the IEEE 802.1AE Media Access Control Security (MACsec) protocol. In particular, the MACsec Key Agreement (MKA) Protocol can enable network devices to exchange keys used for encryption and/or decryption. Unencrypted packets can be encrypted and encapsulated within a MACsec packet, transmitted from one network device to another network device over a network link, and recovered by extracting the encapsulated encrypted packet and decrypting the encrypted packet. Encrypting a packet can include using a cryptographic algorithm to encode data in the packet such that the information in the data generally cannot be understood unless the encrypted data is first decrypted with a decryption key. As used herein, a "key" can refer to a number that varies in length depending on the cryptographic algorithm. Exemplary cryptographic algorithms can be symmetric or asymmetric. For a symmetric algorithm, the same key can be used for encryption and decryption of the data. In other words, a symmetric key can function as both an encryption key and a decryption key for the data. It may be desirable to safeguard a symmetric key, as anyone having access to the key can potentially decrypt data that has been encrypted using the key. Symmetric algorithms can be based on stream ciphers or block ciphers. Examples of symmetric cryptographic algorithms include Advanced Encryption Standard (AES), Data Encryption Standard (DES), triple-DES, Twofish, Serpent, Blowfish, and CAST-128. For an asymmetric algorithm, a public key can be used for encryption and a private key can be used for decryption of data. The public key and the private key form a key pair, where the public key and the private key are mathematically related. The public encryption key can be freely accessible since it can only be used to encrypt data, but it may still be desirable to safeguard the private decryption key since it can be used to potentially decrypt the data. Examples of asymmetric cryptographic algorithms can include the RSA algorithm or an algorithm based on elliptic curve cryptography.

Implementation of a network security protocol to secure and encrypt a link between two network devices can involve a predefined sequence of actions performed by the network devices, in which one of the network devices operates in the server role. Depending on the network security protocol used, another device referred to as an authentication server can optionally participate in the authentication process. Once a link between the network devices is established between respective external-facing ports of the network devices, an authentication process is performed. For example, when the MACsec protocol is used, the authentication process can conform to the Extensible Authentication Protocol (EAP). One exemplary authentication process conforming to the EAP is EAP-Pas sword (EAP-pwd), which is described further below. Typically, in authentication processes that conform to the EAP, one of the network devices assumes the server/authenticator role, and the other assumes the client/supplicant role. The authentication process includes the network devices exchanging start frames. In some examples, the start frames are transmitted to a multicast address, as the network address of the linked network device may not yet be known. When the MACsec protocol is used, the start frames may be referred to as an EAPOL-Start frames, where "EAPOL" refers to the use of EAP over a local area network (LAN) connection.

The contents and format of the start frames can depend on the network security protocol used. A start frame can be an unencrypted link layer packet including one or more headers and an empty (null) payload. Generally, a header is a data structure that provides information about how a packet is formatted and is used by peers to communicate with each other. The format of the header is determined based on the specific networking protocol associated with the header. Thus, a link layer header can be different from a network layer header, and an unencrypted Ethernet header can be different from an encrypted Ethernet header, for example. The header of the start frame can include subfields.

When EAPOL is used, a start frame can include an Ethernet header, an EAPOL header, and an empty (null) payload. The subfields of the Ethernet header can include a destination address (DA) field, a source address (SA) field, and a frame type (FT) field. As a specific non-limiting example, the DA can be six octets or bytes, the SA can be six octets, and the frame type can be a two octet Ethertype.

Continuing with the EAPOL example, the value of the SA field of the Ethernet header can indicate a network address assigned to network device transmitting the start frame. The value of the SA field can be referred to as a "unique identifier" of the network device transmitting the start frame, in that the network address of a network device can serve to uniquely identify the network device. In the context of the MACsec protocol, the value of the source address field can be a Media Access Control (MAC) address of the network device transmitting the start frame, whereas the value of the destination address field can be a special designated multicast MAC address.

It will be appreciated that the MAC address of the network device transmitting the start frame is included by default in standard, unmodified EAPOL-Start frames (e.g., no modification of a standard EAPOL-Start frame is necessary to ensure that this value is included). In other examples, however, the start frame can include other fields, including fields with other types of values that uniquely identify the network device transmitting the start frame. These other unique identifiers can include, for example, a serial number of the network device or of a component within the network device, a central processing unit (CPU) identifier of a CPU of the network device, a Globally Unique Identifiers (GUID) of the of the first and second network devices; respective total-time-turned-on (TTTO) values of the first and second network devices (e.g., determined based on readings of clocks of the first and second network devices); or International Mobile Equipment Identifiers (IMEIs) of the first and second network devices. In some examples, one or more of these other unique identifiers can be included in the payload of the start frame.

Further, continuing with the EAPOL example, the value of the DA field of the Ethernet header can indicate a network address (e.g., MAC address) to which the start frame is to be transmitted. For example, the value of the DA field can be a multicast network address, or an actual address of the network device to which the start frame is to be transmitted. The value of the FT field for EAPOL can be 0x888e, corresponding to 802.1x Authentication.

As described further below with reference to FIG. 1, the network devices may each transmit multiple start frames, depending on the time it takes for the start frames to "converge" or be received at the linked network device. Once the start frames converge, a role resolution process can be performed in accordance with the present disclosure to determine which role each network device should assume during a subsequent authentication process (i.e., server/authenticator or client/supplicant), and optionally during encryption of the link following successful authentication. The authentication process then proceeds with the network devices operating in the determined modes (e.g., after the network devices restart any relevant applications/processes in the appropriate mode).

In one non-limiting example of a MACsec use case, the authentication process utilizes the EAP-pwd authentication method, which is described in Internet Engineering Task Force (IETF) Request for Comments (RFC) 5931. As described in RFC 5931, EAP-pwd is an EAP method that addresses the problem of password-based authenticated key exchange, using a possibly weak password for authentication to derive an authenticated and cryptographically strong shared secret. EAP-pwd in particular involves mutual authentication of two linked network devices. Towards this end, EAP-pwd defines three message exchanges between a network device in a server (authenticator) role and a network device in a client role: an Identity exchange, a Commit exchange, and a Confirm exchange. An example implementation of the EAP-pwd authentication method is described below with reference to FIG. 4B.

Alternatively, in another MACsec use case which does not utilize EAP-pwd, the authentication process proceeds with the "server" network device sending a message referred to as an EAP-Request Identity message to the "client" network device, to request its identity. The "client" network device then provides its identity in a message referred to as an EAP-Response message to the "server" network device. The "server" network device then forwards the identity of the "client" network device to an authentication server (e.g., utilizing the Remote Authentication Dial-In User Service (RADIUS) protocol, in contrast to the EAPOL protocol utilized in communications between the "server" network device and the "client" network device). In particular, the "server" network device sends a message referred to as a RADIUS Access-Request message to an authentication server (e.g., a server external to the "server" and "client" network devices). The authentication server then sends a message referred to as a RADIUS Access-Challenge message to the "server" network device, which contains a "challenge" as well as an authentication method to be used for further communication (e.g., EAP Transport Layer Security (EAP-TLS)). The "server" network device then sends a message referred to as an EAP-Request message to the "client" network device, to verify that it supports the selected authentication method. Assuming the "client" network device does support the selected authentication method, a few more messages are exchanged that relate to the selected authentication method. Subsequently, the selected authentication method is performed to verify the credentials of the "client" network device. This can involve generation and exchange of encryption/decryption keys, such as private keys. The keys can be generated at the authentication server and provided to the "server" network device for distribution, or alternatively the keys can be generated by the "server" network device or by another device. Depending on whether the credentials are correct, the authentication server sends either a RADIUS Access-Accept message or a RADIUS Access-Reject message to the "server" network device. After receiving a RADIUS Access-Accept message from the authentication server, the "server" network device sends back an EAP Success message to the "client" network device, and the port/interface of the "server" network device designated for communications with the "client" network device opens to allow network communications, thereby establishing a secure communication channel between the two devices.

FIG. 1 depicts a diagram 100 of an example first data center 102 including a first network device 108 communicatively coupled with a second network device 110 of an example second data center 104 over a network 130. Network 130 can include a plurality of network zones, and each network zone can be a group of networked computing devices. In one example, first data center 102 and second data center 104 each constitute, or are within, different zones of network 130. In another example, the first and second data centers are within a same zone of network 130, but are separated by an unsecured physical span (e.g., such that communications between first network device 108 of first data center 102 and second network device 110 of second data center 104 are transmitted across a physical space that is not secured by the entity administering the network). In other examples, the first and second data centers 102 and 104 are buildings rather than data centers, e.g., buildings within a same data center or zone, or buildings of different data centers or zones. Depending on the proximity of data centers 102 and 104, among other factors, network 130 can be LAN or a Wide Area Network (WAN), or another type of network.

First data center 102 includes a plurality of devices 114 communicatively coupled to one another. Similarly, second data center 104 includes a plurality of devices 116 communicatively coupled to one another. Devices 114 and 116 can include computing devices (e.g., server computers) as well as network devices. As used herein, a network device is any device that includes ports and is configured to route packets therethrough. Example network devices include routers, switches, bridges, etc. A router, such as an edge router, can be a computing device configured to receive and forward data packets within a computer network and/or between computer networks. In at least some embodiments, a router can be referred to as a switch. The router can be configured to create and maintain a routing table based on routing protocol messages received via one or more computer networks. The router can comprise multiple communication ports connected to other routers (and/or other types of computing devices). The router can be configured to receive data packets from other routers (and/or other computing devices) via the one or more of the communication ports. The router can use data contained in the data packets and the routing table to identify next hop routers (and/or other computing devices) for the data packets and to transmit the data packets to the identified next hops via one or more of the communication ports.

Devices 114 of first data center 102 include first network device 108, which is an edge router configured to provide a point of entry for the first data center/associated network zone. Similarly, devices 116 of second data center 104 include second network device 110, which is an edge router of the second data center configured to provide a point of entry for the second data center/associated network zone. First network device 108 can be configured to route data packets received from devices external to the first data center, such as devices of second data center 104, to devices within the first data center such as other devices 114. First network device 108 can also be configured to route data packets received from devices internal to the first data center to devices external to the first data center, such as devices of second data center 104. Second network device 110 of second data center 104 can function in a similar manner to first network device 108 in the context of the second data center. As discussed further below, the first and second network devices can be configured to transmit start frames in accordance with a network security protocol, as part of a server/client resolution process to determine which of the network devices will take the lead in the authentication process to establish a secure communication channel.

As discussed further below with reference to FIG. 2, the first and second network devices can each include a controller (e.g., CPU), memory, layer 2 hardware, internal-facing port(s), external-facing port(s), and a trusted platform module. The CPU can be configured to execute comparison logic for comparing values of unique identifiers of the network devices such as MAC addresses.

While not included in diagram 100, in some examples, a computing device referred to as an authentication server 112 can configured to communicate with first network device 108 and second network device 110 via network 130. The authentication server can be physically located within first data center 102 or second data center 104, or physically located in a different building, data center, or zone. In such examples, the authentication server can further be configured to perform functions associated with establishing secure communications between network devices in accordance with a network security protocol such as MACsec. For example, the authentication server can generate messages in accordance with the network security protocol to be transmitted by the first and second network devices and any other network devices participating in the network security protocol. Further, the authentication server can perform an authentication process in conjunction with the first and/or second network device, such as the alternative authentication process described above with reference to the MACsec protocol. In examples where the network security protocol is the MACsec protocol, the authentication server may be alternatively referred to as an EAPOL server.

Actions performed by the first and second network devices over a period of time are indicated by the circled numbers 1, 2, 3A, and 3B in FIG. 1. In particular, the circled numbers are used to depict stages of a sequence in which the actions occur. At stage 1, a link between the first and second network devices is established. This can include one or both of the first and second network devices being turned on ("booted up") and connected to network 130. At stage 2, after the link between the first and second network devices has been established, the first and network devices recognize that they are linked together. This prompts the first and second network devices to transmit start frames 118 and 120, respectively. The timing of the start frame transmission by each network device can depend on the amount of time it takes for the network device to fully boot up. If both network devices boot up in the same amount of time, start frames 118 and 120 may be transmitted at the exact same time. However, more often, the network devices will have slightly different boot-up times (e.g., due to minor hardware variations), resulting the start frames being transmitted at slightly different times.

In the depicted example, the network security protocol is the MACsec protocol and the EAP-pwd authentication process is used. Accordingly, the start frames are EAPOL-Start frames which each include an Ethernet header, an EAPOL header, and a payload. The Ethernet header includes a source address ("SA") field, having a value corresponding to the MAC address of the network device transmitting the start frame, a destination address ("DA") field, and a frame type ("FT") field. The SA and DA fields are "default" fields of EAPOL-Start frames, in that they are always present in EAPOL-Start frames (e.g., modifications to standard EAPOL-Start frames are not necessary to incorporate these fields as they are always present in standard EAPOL-Start frames). The EAPOL-Start frames can also include additional fields/values, such as values of one or more unique identifiers in the payload, without departing from the scope of the present disclosure.

As shown, first network device 108 has the example MAC address 01-01-01-01-01-02 (referred to as "MAC1"), whereas second network device 110 has the example MAC address 01-01-01-01-01-01 (referred to as "MAC2"). Accordingly, the SA field of start frame 118, which is transmitted by the first network device, has the address MAC1 as its value. Similarly, the SA field of start frame 120, which is transmitted by the second network device, has the address MAC2 as its value. The value of the DA field in start frames 118 and 120 is a designated multicast network address with the exemplary value 01:80:C2:00:00:03. The value of the FT field in start frames 118 and 120 is 0x888e, which represents 802.1x Authentication.

The EAPOL headers of start frames 118 and 120 both have a version field with a value of 1, a type field with a value of "START", and a length field with a value of 0. Further, start frames 118 and 120 both have null payloads. In other examples, however, the fields of the EAPOL headers and payloads can have other values.

While FIG. 1 depicts transmission of a single start frame by each of the first and second network devices at stage 2, multiple start frames may be transmitted by one or both of the network devices. For example, in a scenario where the first network device boots up faster than the second network device, the first network device may transmit a start frame before the second network device has finished booting up. After waiting a predetermined time period, the first network device transmits the start frame again. This process repeats until a start frame transmitted by the second network device is received at the first network device, which may be referred to as "resolution" or "convergence." However, it will be appreciated that the transmitting and receiving of start frames at a given network device is not directly coupled; rather, these processes are performed independently of one another.

The first and second network devices can generate the start frames. Generation of a start frame by a given network device can include the network device (e.g., a CPU of the network device) populating the start frame with values for a plurality of fields. The values can be values retrieved from memory of the network device, for example. In other examples, however, the start frames can be generated elsewhere (e.g., at an authentication server or another computing device external to the network device).

As described further below with respect to FIG. 2, the start frames are transmitted from, and ultimately received at, Layer 2 (link layer) hardware of the network devices. Each network devices can further include comparison logic executable by the CPU to compare the value of the SA field of the received start frame with the MAC address of the network device itself. For example, at stage 3A, comparison logic of first network device 108 compares the value of the SA field in start frame 120 (i.e., MAC2) with the MAC address of the first network device (i.e., MAC1). In the depicted example, the value of MAC1 is greater than the value of MAC2 (i.e., MAC1 has a higher value), which indicates that the first network device should operate in the server/authenticator mode and the second network device should operate in the client/supplicant mode. As discussed further below, operating in the server mode can entail initiating an authentication process to secure the link between the first and second network devices.

It will be appreciated that selecting the network device with the higher MAC address to operate in the server mode is an arbitrary choice; in other examples, the network devices can be configured to select the network device having the lower MAC address to operate in the server mode. Further, values of other fields in the start frames can be compared by the comparison logic to determine which of the network devices should operate in the server mode versus the client mode. Depending on the network security protocol used, different fields may be present in the start frames; as discussed further below, any field in a start frame that has a value uniquely identifying the network device transmitting the start frame can be used in the comparison. Optionally, start frames of a given network security protocol can be customized/modified to incorporate additional fields to be used in the comparison.

At stage 3B, similar to stage 3A, comparison logic within the Layer 2 hardware of second network device 110 compares the value of the SA field in start frame 118 (i.e., MAC1) with the MAC address of the second network device (i.e., MAC2). In the depicted example, the value of MAC2 is lower than the value of MAC1; as noted above, this indicates that the second network device should operate in the client/supplicant mode. As discussed further below, operating in the client mode can entail participating in the authentication process by authenticating the other network device, but not initiating the authentication process. Stages 3A and 3B may be performed simultaneously, or at slightly different times, depending on the respective boot times and other operating parameters of the first and second network devices.

Figure 2:
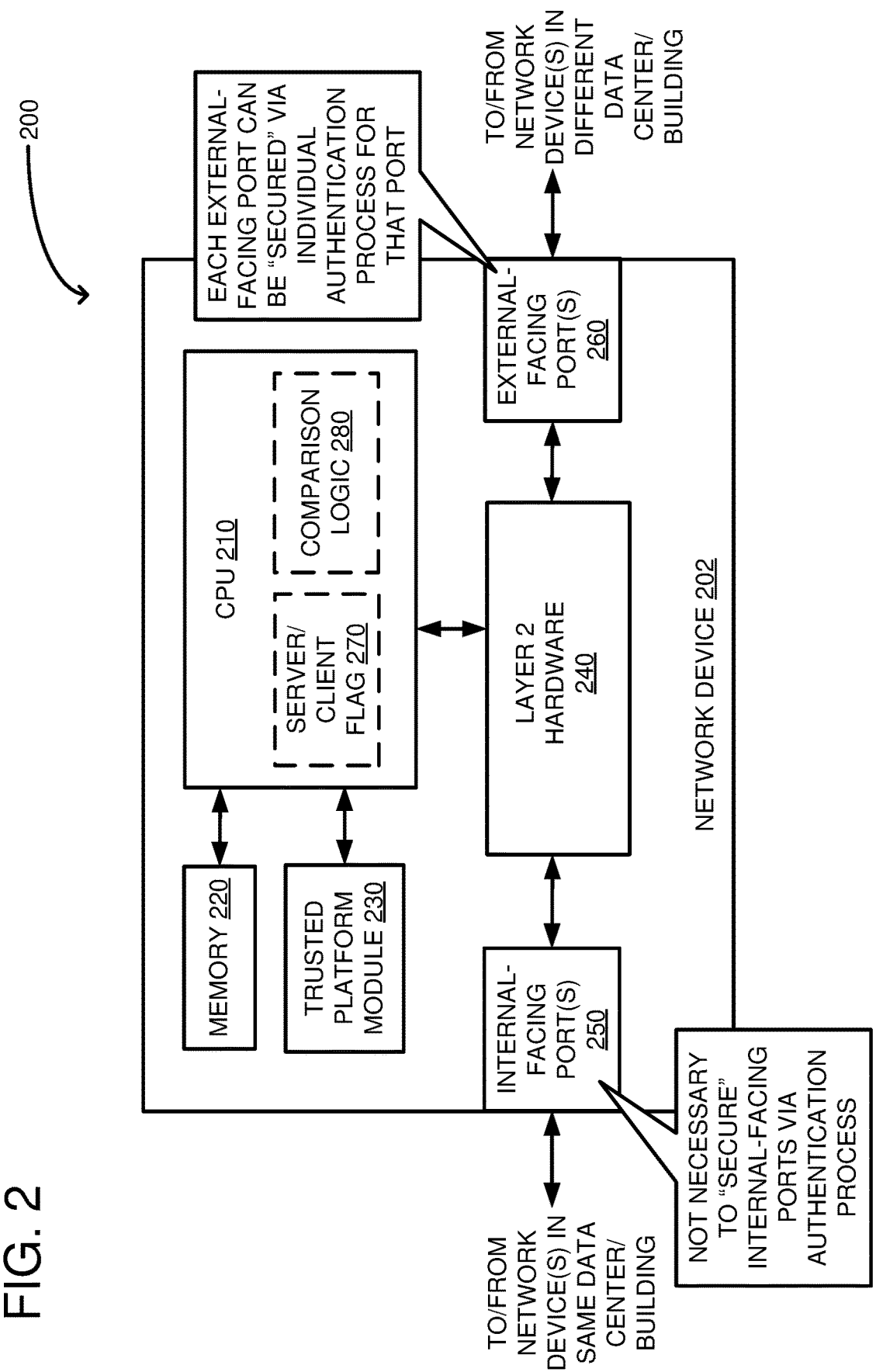
FIG. 2 is a diagram of an example network device configured to exchange start frames with another network device to perform server/client resolution, in accordance with one embodiment.

FIG. 2 is a diagram 200 of an example network device 202, which can correspond to first network device 108 and/or second network device 110 of FIG. 1. Network device 202 is a switch that routes packets to a next hop in the network using a destination address (e.g., a destination IP address). A CPU (e.g., controller) 210 is coupled to a memory 220 and to Layer 2 hardware 240, through a bus (PCIe or other protocols and bus types can be used).

Layer 2 hardware 240 can be a single ASIC integrated circuit, or can be divided into multiple integrated circuits. Layer 2 hardware 240 relates to an Ethernet layer and can forward packets based on MAC tables, for example. Further, Layer 2 hardware 240 can be part of, or can incorporate, switching logic of the network device. As shown, the Layer 2 hardware is positioned between one or more internal-facing ports 250 and one or more external-facing ports 260, which are typically adapted to receive network cables, such as Ethernet cables. Internal-facing port(s) 250 can be linked to and communicate with corresponding ports in network devices within the same data center/building/secured physical space as network device 202. In contrast, external-facing port(s) 260 can be linked to and communicate with corresponding ports in network devices external to the data center/building/secured physical space that houses network device 202. In one non-limiting example, network device 202 can include a total of 32 ports, of which 16 are internal-facing ports and 16 are external-facing ports. In other examples, however, other numbers of ports can be included in network device 202.

Each external-facing port 260 can each be secured via a respective authentication processes in accordance with a network security protocol such as MACsec, so as to secure links between the external-facing port(s) 260 and external-facing port(s) of other network devices separated from the network device by an unsecured physical space (e.g., a space between buildings or data centers). In contrast, it may not be necessary to secure the internal-facing port(s) which are linked to ports of other network devices within a physically-secured space such as a building or data center. In particular, each of the external-facing ports 260 can be linked to a corresponding port of a network device separated from network device 202 by an unsecured physical span (e.g., a second network device in a different building or data center, as shown in FIG. 1). For example, a link can be established between one of the external-facing port(s) 260 of network device 202 and one of the external-facing ports of a second network device (e.g., due to both network devices being online and the ports being connected via a physical link such as a cable or wire).

After the (not yet secure) link is established, a server/client resolution process can be performed, as described further below. The process can include the network devices exchanging start frames. Towards this end, network device 202 can route a start frame (e.g., start frame 118 of FIG. 1) to the linked external-facing port of the second network device. Similarly, the second network device can route a start frame (e.g., start frame 120 of FIG. 1) to the linked external-facing port of network device 202. Comparison logic in the respective network devices can then compare a value of a unique identifier in the received start message (e.g., a MAC address of the network device the transmitted the start message) to a corresponding unique identifier of the network device itself, and based on the comparison, determine whether to operate in a server mode or a client mode during a subsequent authentication process, and optionally also during a process for encrypting the link following successful authentication.

The comparison logic can be executed by the CPUs of the network devices. For example, as shown in FIG. 2, CPU 210 of network device 202 includes comparison logic 280. Comparison logic 280 can be configured to compare values of fields in messages/frames/packets received at the Layer 2 hardware (e.g., via the external-facing port(s) 280 with stored values. In some examples, the comparison logic comprises registers (e.g., comparators) configured to perform the comparison. Based on the result of the comparison, CPU 210 can initiate operation of the network device in either the server mode or the client mode. For example, CPU 210 can optionally set or clear the value of a server/client flag 270 based on the comparison, or take another action that causes the network device to assume one of the roles based on the comparison.

In a MACsec protocol use case, a start frame received at the Layer 2 hardware can be an EAPOL-Start frame such as start frame 118 of FIG. 1. The EAPOL-Start frame can include, among other fields, a SA field indicating a MAC address of the network device that transmitted the message (e.g., second network device 110 of FIG. 1). In this scenario, the comparison logic can compare the value of the SA field in the EAPOL-Start frame to the MAC address of the network device that received the message (e.g., first network device 108 of FIG. 1). Based on the comparison, a determination of whether to operate the first network device in the server mode or client mode can be made. The determination can be made by one or more of the comparison logic, the Layer 2 hardware, other logic in the CPU, or a device that communicates with the first network device over a network.

Network device 202 further includes a Trusted Platform Module (TPM) 230. TPM 230 can be an integrated circuit (e.g., hardware chip) configured to prevent tampering. TPM 230 can store values such as keys (e.g., password-shared keys) that are used in an authentication process in which network devices mutually authenticate one another to establish a secure communication channel therebetween, such as the EAP-pwd authentication process described herein. In the depicted example, TPM 230 is coupled with, and configured to transmit data to and from, CPU 210. TPM 230 can optionally be coupled in a similar manner with other components of network device 202 such as Layer 2 hardware 240.

Returning to FIG. 1, while the various stages of an authentication process are depicted for a single link between ports of the first and second network devices, it will be appreciated that similar authentication processes can be carried out, in some cases concurrently, for other pairs of ports of the first and second network devices. Alternatively, one or more of the external-facing ports of the first network device can be linked with a corresponding port of a third network device, a fourth network device, etc., and the links can be secured in a similar manner. For example, if the first network device has 16 external-facing ports, each external-facing port can be linked to an external-facing port of another network device, and the links can be secured in the manner described herein. In some examples, all 16 external-facing ports of the first network device are linked to corresponding external-facing ports of a single network device (e.g., the second network device). In other examples, the external-facing ports to which the 16 external-facing ports are linked, respectively, are divided between two or more different network devices. However, for the sake of clarity, a single authentication process for a single link between an external-facing port of the first network device and an external-facing port of the second network device is depicted in FIG. 1.

While not shown in FIG. 2, network device 202 can further include Layer 3 hardware for forwarding packets based on a longest prefix match of an IP address. Layer 3 typically involves a route lookup, decrementing a time-to-live (TTL) count, calculating a checksum, and forwarding the frame with the appropriate MAC header to the correct port. The route lookup of the Layer 3 hardware can include searching within a Forwarding Information Base (FIB), which includes destination addresses for packets being transmitted through switching logic of the network device. To communicate with other Layer 3 switches or routers, network device 202 can run intra-domain routing protocols, such as Open Shortest Path First (OSPF) or Routing Information Protocol (RIP), or inter-domain routing protocols such as BGP. Routing tables can be used to look up the route for an incoming packet.

Figure 3:
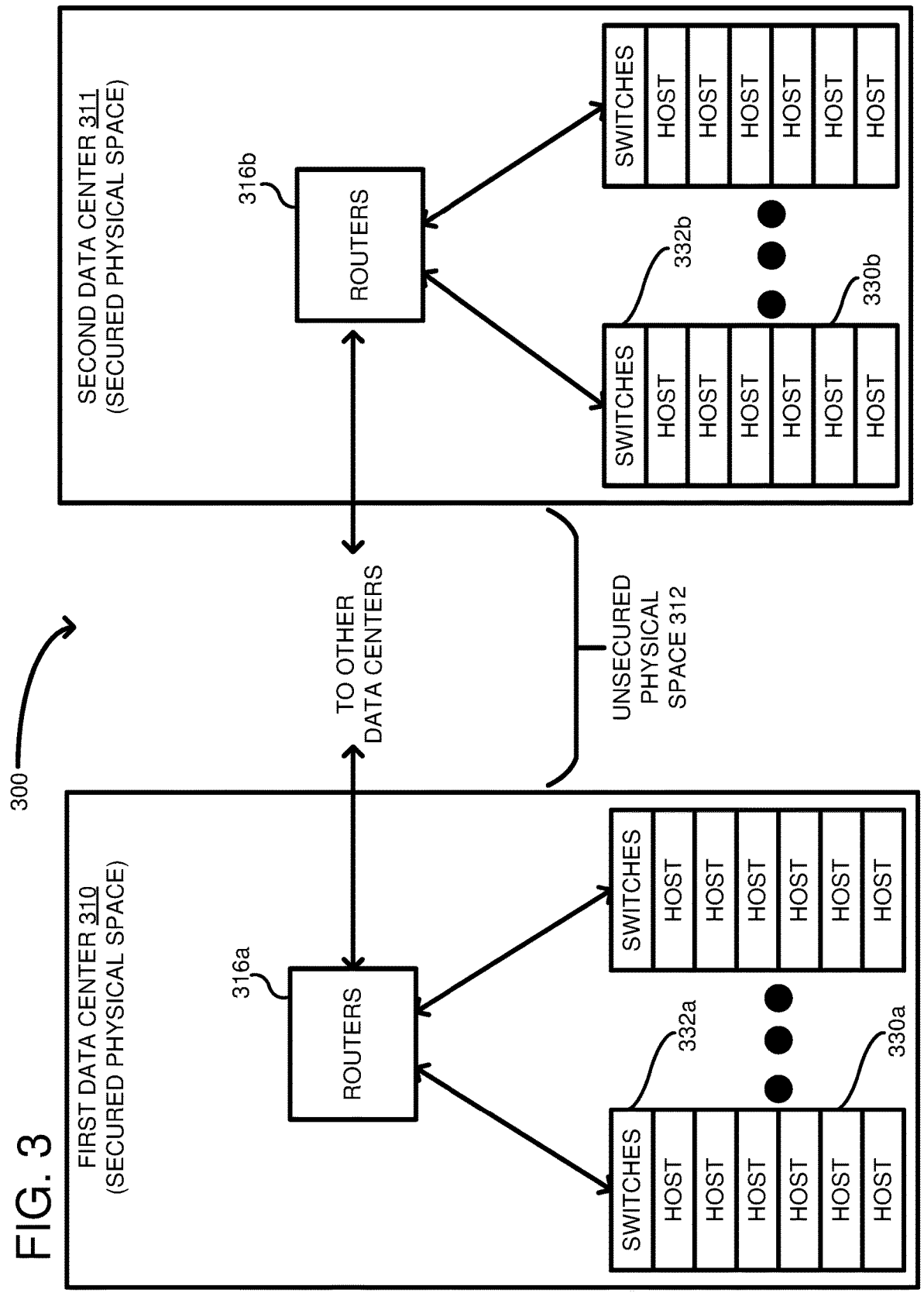
FIG. 3 is a diagram of two data centers separated by an unsecured physical space, in accordance with one embodiment.

FIG. 3 is a diagram 300 of a first data center 310 and a second data center 311 that are separated by an unsecured physical space 312. The first and second data centers can correspond to the first and second data centers 102 and 104 of FIG. 1, respectively. First data center 310 and second data center 311 are coupled together by respective routers 316a and 316b. For example, routers 316a of the first data center can include an edge router corresponding to first network device 108 of FIG. 1, whereas routers 316b of the second data center can include an edge router corresponding to second network device 110 of FIG. 1. The routers 316a and 316b can be configured to read address information in a received packet and determine the packet's destination. For example, if a router 316a decides that a different data center contains a host server computer, then the packet is forwarded to that data center. If the packet is instead addressed to a host in the first data center 310, then it can optionally be passed to a network address translator (NAT) (not shown) that converts the packet's public IP address to a private IP address. The NAT also translates private addresses to public addresses that are bound outside of the first data center 310. Additional routers can be coupled to the NAT to route packets to one or more racks of host server computers 330a. Each host server computer has underlying hardware including one or more CPUs, memory, storage devices, etc. Each rack 330a can include a switch 332a coupled to multiple host server computers. Like numbered components of the second data center 311 (e.g., switches 332b, and hosts 330b) function in a similar manner to the corresponding components of the first data center.

Due to the unsecured physical space 312 separating the first and second data centers, an administrator of the data centers may choose to enact a network security protocol such as MACsec for transmissions of data between the data centers. In contrast, the administrator of the data centers may refrain from enacting the network security protocol for transmissions of data within a given data center. Accordingly, the various network devices within the data centers can be configured to either utilize or not utilize a network security protocol depending on whether a given message/packet/frame is to be routed to another network device within a secured space (e.g., within a building or data center), or to a network device separated by an unsecured physical space (e.g., a network device in a different building or data center, or in a portion of the same building or data center that is not physically secured by the network administrator).

Figure 4A:
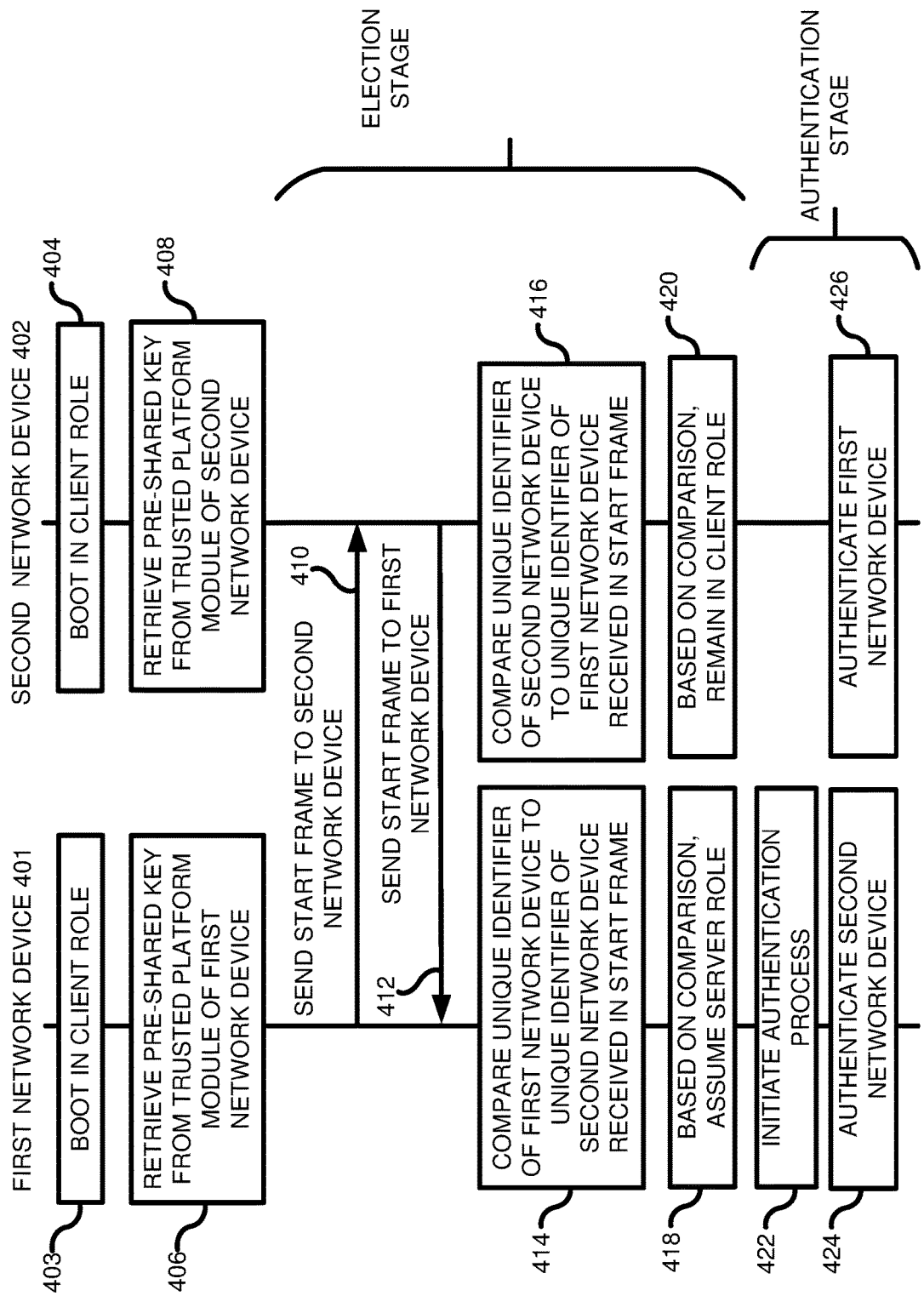
FIGS. 4A-B illustrates example actions taken by, and interactions between, a first network and a second device, in accordance with one embodiment.

FIG. 4A is a diagram 400 illustrating example actions performed by, and interactions between, a first network device 401 and a second network device 402. In particular, FIG. 4A depicts an election stage and an authentication stage that occur after a link is established between the first and second network device; these stages are performed in order to secure the link between the first and second network devices. First network device 401 can correspond to first network device 108 of FIG. 1, and second network device 402 can correspond to second network device 110 of FIG. 1. Whereas the example shown in FIG. 1 is specific to the MACsec network security protocol in some regards, FIG. 4A is more general and can pertain to another network security protocol.

At 403, the first network device boots in a client role. For example, the first network device can be configured to initially assume the client role upon start-up (e.g., a CPU of the first network device can be configured such that a server/client flag has a value representing the client role when the network device first starts up). Similarly, at 404, the second network device boots in the client role. In other examples, however, the first and second network devices may not assume any role upon start-up.

At 406, after booting up, the first network device retrieves a pre-shared key (PSK) from a Trusted Platform Module of the first network device (e.g., TPM 230 of FIG. 2). Similarly, at 408, the second network device retrieves a PSK from a TPM of the second network device. For example, the same PSK can be stored in the TPMs of the first and second network devices when they are initially configured (e.g., by a network administrator or other party). As described further below, the PSKs can be used by the first and second network devices to mutually authenticate one another in an authentication process such as EAP-pwd. A PSK can be a "secret" string of characters, for example.

An election stage, in which an election is made as to which of the first and second network devices will take the server role and which will take the client role, begins at 410. At 410, the first network device sends (e.g., transmits) a start frame to the second network device. For example, as discussed above, the DA field of the start frame can be a designated multicast network address; frames transmitted from the first network device to the designated multicast network address will arrive at the linked network device, in this case the second network device. Similarly, at 412, the second network device sends a start frame to the same designated multicast address; frames transmitted from the second network device to the designated multicast address will arrive at the linked network device, in this case the first network device.

At 414, the first network device compares a unique identifier of the first network device to a unique identifier of the second network device received in the start frame sent by the second network device. The comparison can be performed by comparison logic of the first network device such as comparison logic 280 of FIG. 2, for example. Similarly, at 416, the second network device compares a unique identifier of the second network device to a unique identifier of the first network device received in the start frame sent by the first network device.

At 418, based on the comparison, the first network device assumes the server role. For example, the comparison of the unique identifiers can reveal a relationship between the unique identifiers, and the first and second network devices can be configured to assume either the server role or the client role depending on the nature of the relationship. In one example, the first network device can be configured to operate in the server mode if the unique identifier of the second network device (e.g., the MAC address of the second network device) has a value lower than the value of its own unique identifier. In another example, the first network device can be configured to operate in the server mode if the unique identifier of the second network device (e.g., the MAC address of the second network device) has a value higher than the value of its own unique identifier. In other examples, however, the first network device can use another arbitrary criterion in determining whether to assume the server role or the client role. For example, the start frames exchanged by the first and second network devices can be modified (non-standard) start frames which are modified to include a unique identifier in the payload, and the unique identifier in the payload can be compared with a corresponding unique identifier of the network device that receives the start frame to make the determination of which role to assume.

In contrast, at 420, the second network device remains in the client role based on the comparison. For example, when evaluating the result of the comparison of the unique identifier of the first network device to its own unique identifier, the second network device can use the same criterion that was used by the first network at 418. Use of the same criterion by the first and second network devices can ensure a consistent role determination among the two devices, regardless of the actual criterion used (which can be arbitrary). The election stage concludes after 420.

An authentication stage, in which an authentication process is performed by the first and second network devices, begins at 422. At 422, the first network device initiates authentication of the first and second network devices, for example in accordance with an authentication process such as the EAP-pwd authentication process. At 424, the first network device authenticates the second network device. Similarly, at 426, the second network device authenticates the first network device (following the initiation of the authentication process by the server network device, i.e., the first network device, at 422). Accordingly, FIG. 4A is directed to an example in which mutual authentication is performed by the two network devices after the network device in the server role has initiated the authentication process. Such an authentication process is described in more detail below with respect to FIG. 4B.

Figure 4B:
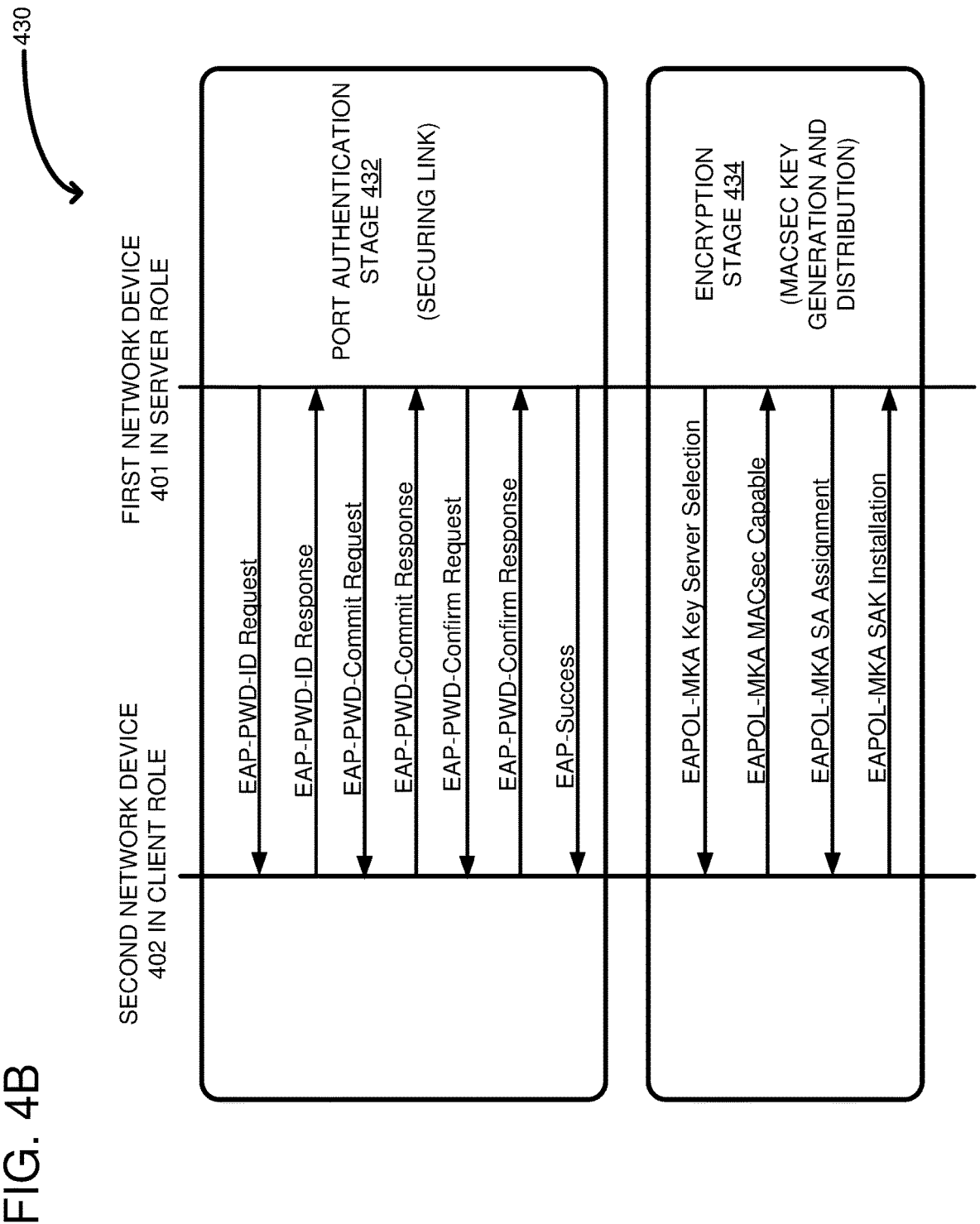

FIG. 4B is a diagram 430 illustrating example actions performed by, and interactions between, a first network device 401 and a second network device 402 after server/client resolution has been performed. The actions shown in diagram 430 can be performed after completion of the election stage shown in FIG. 4A, for example. FIG. 4B depicts a port authentication stage 432, which secures the link between the first and second network devices, and an encryption stage 434, which provides additional security by encrypting the link via MACsec key generation and distribution. As in FIG. 4A, first network device 401 can correspond to first network device 108 of FIG. 1, and second network device 402 can correspond to second network device 110 of FIG. 1. While an EAP-pwd authentication process is depicted in FIG. 4B at authentication stage 432, it will be appreciated that other authentication processes can alternatively be performed without departing from the scope of this disclosure. Similarly, whereas FIG. 4B depicts an example where the MACsec protocol is used as the network security protocol, other network security protocols can alternatively be used without departing from the scope of this disclosure.

During port authentication stage 432, a series of communications are exchanged between first network device 401, which has assumed the server role, and second network device 402, which has assumed the client role. First, the first network device transmits an EAP-PWD-ID Request to the second network device, thereby initiating the authentication process. The second network device responds by transmitting an EAP-PWD-ID Response to the first network device. This exchange is referred to as an "Identity exchange," as it allows the first and second network devices to discover each other's identities and agree upon a Ciphersuite to use in the subsequent exchanges. In addition, the network device in the server role (here, the first network device) uses the EAP-PWD-ID Request message to inform the network device in the client role (here, the second network device) of any password pre-processing that may be required.

After completion of the Identity exchange, an exchange referred to as a "Commit exchange" is performed. In the Commit exchange, the server and client network devices exchange information to generate a shared key and also to bind each other to a particular guess of a password (e.g., the PSK discussed above with reference to FIG. 4A). In particular, the Commit exchange begins when the first network device transmits an EAP-PWD-Commit Request to the second network device, which responds by transmitting an EAP-PWD-Commit Response to the first network device. If the EAP-PWD-Commit exchange fails, the network device in the server role terminates the exchange. Otherwise, the server network device initiates a "Confirm exchange."

In the Confirm exchange, the server and client network devices prove liveness and knowledge of the password (e.g., PSK) by generating and verifying verification data. In particular, the Confirm exchange begins when the first network device transmits an EAP-PWD-Confirm Request to the second network device, which responds by transmitting an EAP-PWD-Confirm Response to the first network device. If the EAP-PWD-Confirm exchange fails, the server network device terminates the exchange. Otherwise, the server network device transmits an EAP-Success message to the client network device, thereby completing the authentication process. The link is then designated as a secure communication channel. Further security can be provided via optional encryption stage 434.

In encryption stage 434, the server network device (here, the first network device) begins by transmitting an EAPOL-MKA Key Server Selection frame to the second network device. The second network device then transmits an EAPOL-MKA MACsec Capable frame to the first network device. Next, the first network device transmits an EAPOL-MKA SA Assignment frame to the second network device. The second network device then transmits an EAPOL-MKA SAK Installation frame to the first network device, thereby concluding the encryption stage. At this point, the link between the first and second network devices can be considered an encrypted link.

Figure 5:
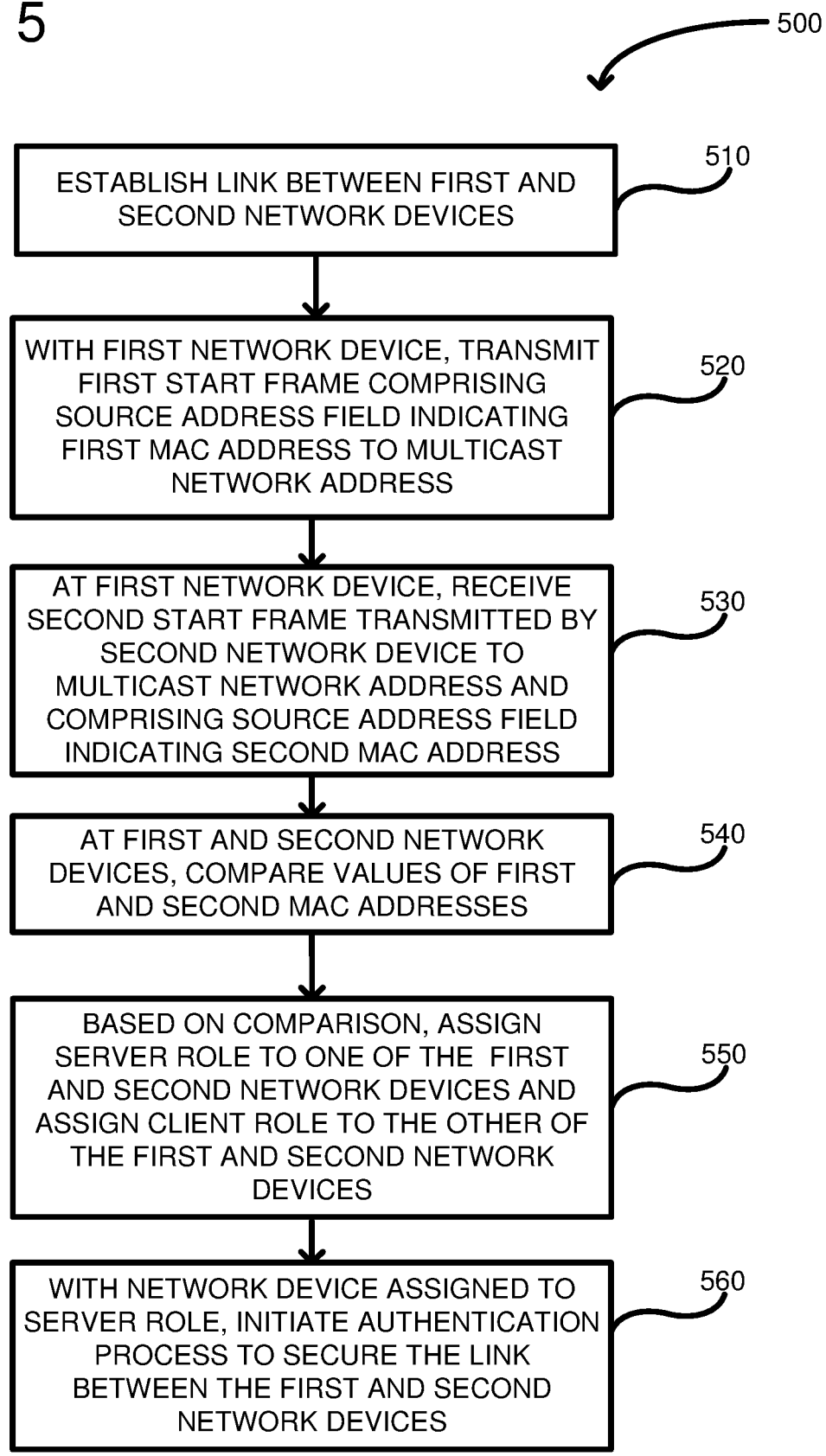
FIG. 5 is a flowchart of an example embodiment for performing server/client resolution of two linked network devices.

FIG. 5 is a flowchart 500 according to one embodiment for performing server/client resolution of two linked network devices (e.g., a first network device and a second network device). The first and second network devices can correspond to first network device 108 and second network device 110 of FIG. 1, for example. In process block 510, a link between first and second network devices is established, e.g., in the manner described above with respect to stage 1 of FIG. 1. In process block 520, the first network device transmits a first start frame (e.g., start frame 118 of FIG. 1) comprising an SA field indicating a first MAC address to a multicast network address. For example, the SA field can be a field within an Ethernet header of the first start frame. In process block 530, the first network device receives a second start frame (e.g., start frame 120 of FIG. 1) transmitted by a second network device to a multicast network address, the second start frame comprising an SA field indicating a second MAC address (e.g., an SA field within an Ethernet header of the second start frame). As discussed above, the start frames can also include additional fields, such as a DA field in the Ethernet header indicating the multicast network address to which the start frames are to be transmitted.

In process block 540, the values of the first and second MAC addresses are compared at each of the first and second network devices, for example in the manner discussed above with reference to FIG. 4 at 414 and 416. In process block 550, based on the comparison, the server role is assigned to one of the first and second network devices, and the client role is assigned to the other of the first and second network devices. The role assignment can be performed in the manner discussed above with reference to FIG. 4 at 418 and 420, for example.

In process block 560, the network device assigned to the server role in process block 550 initiating an authentication process to secure the link between the first and second network devices (e.g., the authentication process shown in FIG. 4B, or different authentication process).

Figure 6:
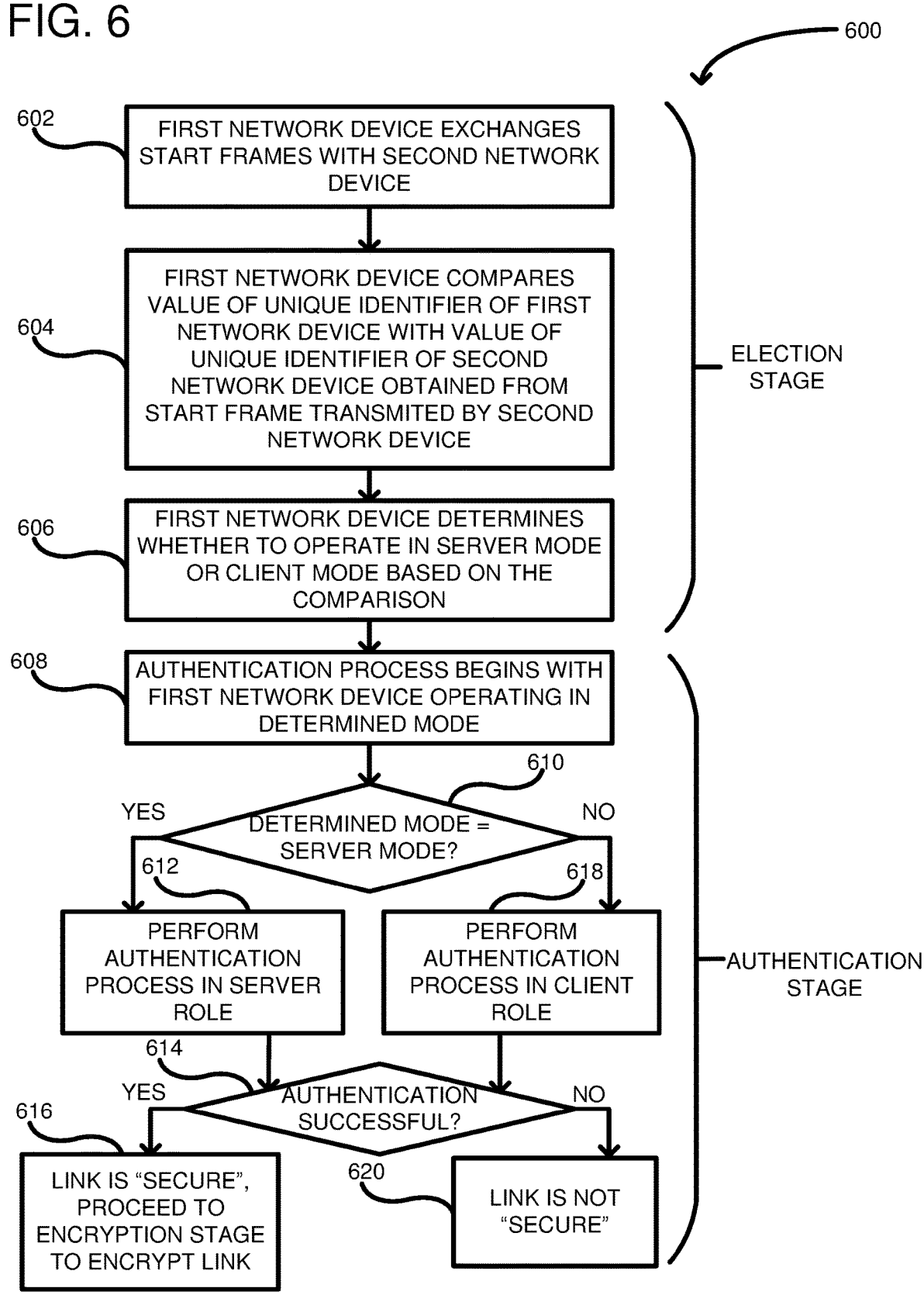
FIG. 6 is a flowchart of an example embodiment for performing server/client resolution and authentication of two linked network devices.

FIG. 6 is a flowchart 600 according to another embodiment for performing server/client resolution and authentication of two linked network devices. In particular, flowchart 600 pertains to server/client resolution (the indicated election stage) and authentication (the indicated authentication stage) of first and second network devices, from the point of view of the first network device. In process block 602, a first network device exchanges start frames with a second network device. In process block 604, the first network device compares a value of a unique identifier of the first network device with a value of a unique identifier of a second network device obtained from the start frame transmitted by the second network device. In process block 606, the first network device determines whether to operate in the server mode or the client mode based on the comparison performed at process block 604. This concludes the election stage.

In process block 608, the authentication process begins with the first network device operating in the determined mode. For example, this can include the first network device restarting any relevant applications or processes in the determined mode. In decision block 610, a determination is made as to whether the determined mode is the server mode. The determination can be performed by the CPU of the first network device, for example. If the answer at decision block 610 is YES, indicating that the determined mode for the first network device is the server mode, the first network device performs an authentication process in the server role in process block 612 (e.g., by performing the actions performed by first network device 401 in the port authentication stage of FIG. 4B). Otherwise, if the answer at decision block 610 is NO, indicating that the determined mode for the first network device is the client mode, the first network device performs an authentication process in the client role in process block 618 (e.g., by performing the actions performed by second network device 402 in the port authentication stage of FIG. 4B).

In either case, after the authentication process is performed, it is determined in decision block 614 whether the authentication process was successful. If the answer at decision block 614 is YES, indicating that authentication was successful, it is determined at process block 616 that the link is "secure"; thus an encryption stage can optionally be performed to encrypt the link, to provide additional security. Otherwise, if the answer at decision block 614 is NO, it is determined at process block 620 that the link is not "secure." This can trigger remedial actions; as just one non-limiting example, the first network device can attempt to establish a link over a different external-facing port, or with a different external-facing port of the second network device.

In examples where the first network device proceeds to the encryption stage to encrypt the link, this stage can include the network device in the server role generating a key (e.g., an encryption/decryption key) and transmitting the key to the network device in the client role. The server network device can use the key to encrypt and decrypt subsequent communications with the client network device. Additionally or alternatively, the encryption stage can include the actions shown in encryption stage 434 of FIG. 4B.

Figure 7:
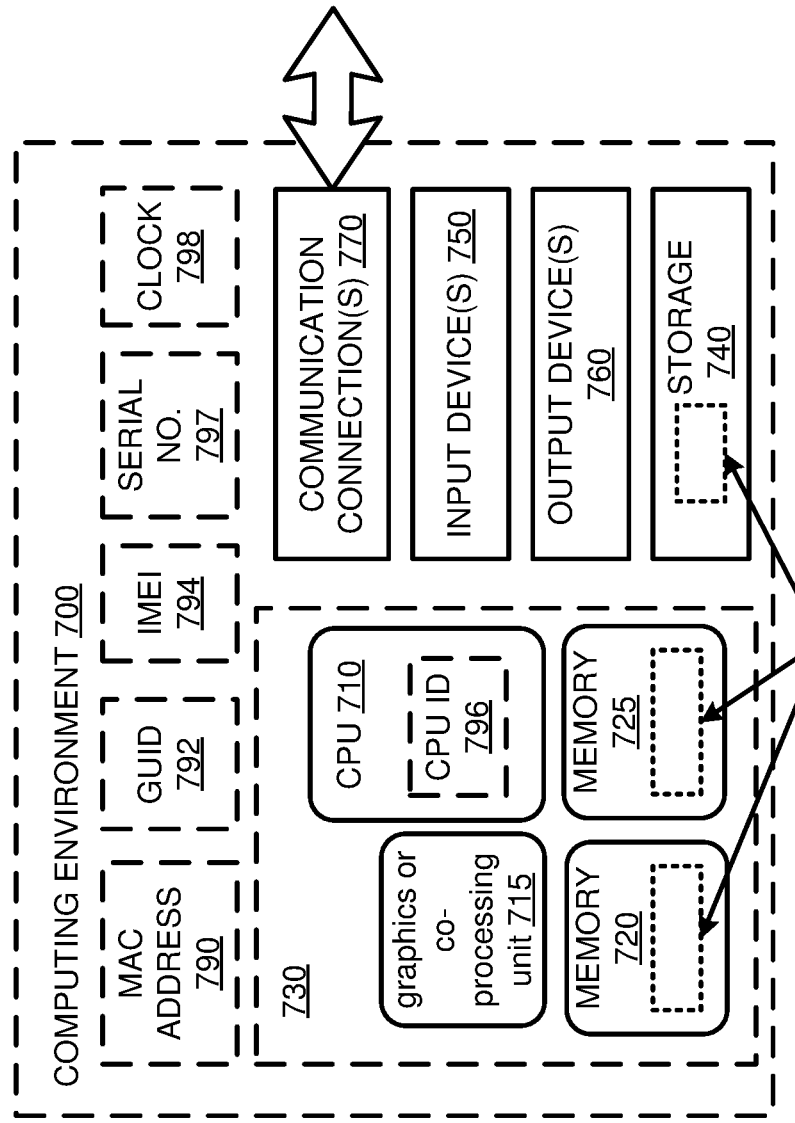
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., a network device such as a router or switch, a desktop computer, a laptop computer, a server computer, a tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose CPU, a processor in an application-specific integrated circuit (ASIC) or any other type of processor. In a multi-processing system, multiple processing units execute computer-executable instructions to increase processing power. For example, FIG. 7 shows a CPU 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The computing environment 700 can further optionally include one or more unique identifiers. The unique identifiers can be stored in memory of the computing environment (e.g., memory 720 or 725), in storage 740, or elsewhere. For example, if the computing environment is a network device such as a router or switch, comparison logic of the network device can be used to compare the value of the unique identifier to a value of a corresponding unique identifier of another network device (e.g., a value received in a start frame transmitted by the other network device). As discussed above, based on the comparison, the network device can determine whether to proceed with authentication in a server mode or client mode.

The unique identifiers can include a MAC address 790 of the computing environment (e.g., network device). The MAC address 790 can be stored in memory of the network device, or elsewhere in the computing environment. Other possible unique identifiers of a computing environment such as a network device include a GUID 792, an IMEI 794, and a CPU identifier (ID) 796, and a serial number 797. In the depicted example, the CPU ID is stored within CPU 710, e.g., in memory internal to CPU 710. In other examples, however, the CPU ID can be stored elsewhere in the computing environment.

In addition, the computing environment can optionally include a clock 798. While depicted in the computing environment generally, clock 798 can alternatively be an internal component of CPU 710, or an internal component of another portion of the computing environment. By reading the value of clock 798, another unique identifier of the computing environment (e.g., network device), the total-time-turned-on (TTTO) value, can be determined.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of securing a link between two network devices in accordance with a network security protocol, the method comprising:
   establishing a link between an external-facing port of a first network device and an external-facing port of a second network device, wherein the first network device is an edge router located in a first data center and the second network device is an edge router located in a second data center, the first and second data centers being separated by an unsecured physical span;
   with the first network device, transmitting a first start frame in accordance with the network security protocol to the second network device, the first start frame comprising a source address field indicating a first Media Access Control (MAC) address of the first network device;
   at the first network device, receiving a second start frame transmitted by the second network device in accordance with the network security protocol to the first network device, the second start frame comprising a source address field indicating a second MAC address of the second network device;
   at both network devices, comparing values of the first and second MAC addresses to determine which is higher or lower;
   based on the comparison, assigning a server role to one of the first and second network devices, and assigning a client role to the other of the first and second network devices; and
   the network device assigned to the server role initiating an authentication process with the network device assigned to the client role to secure the link,
   wherein the first network device further comprises one or more internal-facing ports, and
   wherein the method further comprises linking the one or more internal-facing ports to corresponding ports of one or more other network devices located within the first data center without performing any authentication processes.

2. The method of claim 1, wherein transmitting the first start frame to the second network device comprises transmitting the first start frame to a multicast network address, and wherein the second start frame is transmitted by the second network device to the same multicast network address.

3. The method of claim 1, wherein the network security protocol is the Media Access Control Security (MACsec) protocol, wherein the first and second network devices are linked over a local area network (LAN), and wherein the first and second start frames are default, unmodified EAPOL-Start frames.

4. The method of claim 1, wherein the first and second network devices initially assume the client role before the assigning.

5. The method of claim 1, wherein comparing the values of the first and second MAC addresses to determine which is higher or lower at both network devices comprises:
   at the first network device, retrieving the second MAC address from the second start frame for comparison with the first MAC address; and
   at the second network device, receiving the first start frame and retrieving the first MAC address from the first start frame for comparison with the second MAC address.

6. One or more computer-readable storage media comprising computer-executable instructions that, when executed, cause a first network device to perform a method comprising:
   exchanging start frames with a second network device in accordance with a network security protocol, the exchanged start frames comprising a first start frame transmitted by an external-facing port of the first network device and a second start frame transmitted by an external-facing port of the second network device, the first start frame comprising a unique identifier of the first network device and the second start frame comprising a unique identifier of the second network device;
   comparing a value of the unique identifier of the first network device with a value of the unique identifier of the second network device;
   determining whether to operate the first network device in a server mode or a client mode based on the comparison; and
   operating the first network device in the determined mode in an authentication process to secure a link between the external-facing port of the first network device and the external-facing port of the second network device,
   wherein the first network device is an edge router located in a first data center and the second network device is an edge router located in a second data center,
   wherein the first and second data centers are separated by an unsecured physical span, and
   wherein the first network device further comprises one or more internal-facing ports configured to be linked to corresponding ports of one or more other network devices located within the first data center without performing any authentication processes.

7. The computer-readable storage medium of claim 6, wherein the first and second start frames are standard start frames in accordance with the network security protocol.

8. The computer-readable storage medium of claim 6, wherein the unique identifier of the first network device uniquely identifies the first network device using a Media Access Control (MAC) address of the first network device, and wherein the unique identifier of the second network device uniquely identifies the second network device using a MAC address of the second network device.

9. The computer-readable storage medium of claim 8, wherein the network security protocol is a link level security protocol, and wherein the unique identifiers of the first and second network devices comprise respective network addresses of the first and second network devices.

10. The computer-readable storage medium of claim 6, wherein the unique identifiers of the first and second network devices comprise: respective serial numbers of the first and second network devices; respective central processing unit (CPU) identifiers of the first and second network devices; respective Globally Unique Identifiers (GUIDs) of the first and second network devices; respective total-time-turned-on (TTTO) values of the first and second network devices; or International Mobile Equipment Identifiers (IMEIs) of the first and second network devices.

11. The computer-readable storage medium of claim 6, wherein the determined mode is the server mode, and wherein operating the first network device in the server mode in the authentication process comprises initiating the authentication process with the first network device and then authenticating the second network device.

12. The computer-readable storage medium of claim 6, wherein the determined mode is the client mode, and wherein operating the first network device in the client mode comprises, after initiation of the authentication process by the second network device, authenticating the first network device.

13. The computer-readable storage medium of claim 6, wherein exchanging start frames with the second network device in accordance with the network security protocol comprises the first network device transmitting the first start frame to a multicast network address and the second network device transmitting the second start frame to the multicast network address, and wherein the first and second network devices are configured to receive messages transmitted by one another to the multicast network address.

14. A first network device, comprising:
- a first external-facing port configured to obtain a start frame transmitted by a second external-facing port of a second network device in accordance with a network security protocol;
- layer 2 hardware configured to extract a unique identifier of the second network device from the start frame;
- comparison logic configured to compare a value of the unique identifier of the second network device with a value of a corresponding unique identifier of the first network device; and
- a controller configured to determine whether to operate the first network device in a server mode or a client mode based on the comparison and to operate the first network device in the determined mode in an authentication process to secure a link between the first external-facing port of the first network device and the second external-facing port of the second network device,
- wherein the first network device is an edge router located in a first data center, and wherein the second network device is an edge router located in a second data center separated from the first data center by an unsecured physical span, and
- wherein the first network device further comprises one or more internal-facing ports configured to be linked to corresponding ports of one or more other network devices located within the first data center without performing any authentication processes.

15. The first network device of claim 14, wherein the first network device is configured to transmit, via the first external-facing port, a start frame in accordance with the network security protocol to the second external-facing port of the second network device, the start frame comprising the unique identifier of the first network device.

16. The first network device of claim 15, wherein the transmitted start frame is a standard start frame in accordance with the network security protocol and includes, by default, a field indicating the unique identifier of the first network device.

17. The first network device of claim 15, further comprising one or more additional external-facing ports configured to be securely linked to corresponding ports of one or more other network devices located external to the first data center via respective authentication processes.

18. The first network device of claim 14, wherein the unique identifier of the first network device uniquely identifies the first network device using a network address of the first network device, and wherein the unique identifier of the second network device uniquely identifies the second network device using a network address of the second network device.

* * * * *